United States Patent [19]
Jones

[11] Patent Number: 5,228,765
[45] Date of Patent: Jul. 20, 1993

[54] MOVABLE LIGHT PROJECTOR

[76] Inventor: Aaron Jones, 3 Vaquero Rd., Santa Fe, N. Mex. 87505

[21] Appl. No.: 795,057

[22] Filed: Nov. 20, 1991

[51] Int. Cl.$^5$ ................................................ F21V 7/04
[52] U.S. Cl. ........................................ 362/32; 362/17; 362/18; 362/340
[58] Field of Search ....................... 362/26, 16, 17, 18, 362/32, 220, 224, 399, 340; 128/397, 398

[56] References Cited
U.S. PATENT DOCUMENTS
4,528,617  7/1985  Blackington ........................... 362/32

Primary Examiner—Stephen F. Husar
Attorney, Agent, or Firm—Kolisch Hartwell Dickinson McCormack & Heuser

[57] ABSTRACT

A light projector includes a light source, which provides a light stream, an elongate light wand, including an elongate transparent rod therein, for converting the light stream into an elongate light beam. An optical connector is provided for connecting the light wand to the light source.

23 Claims, 2 Drawing Sheets

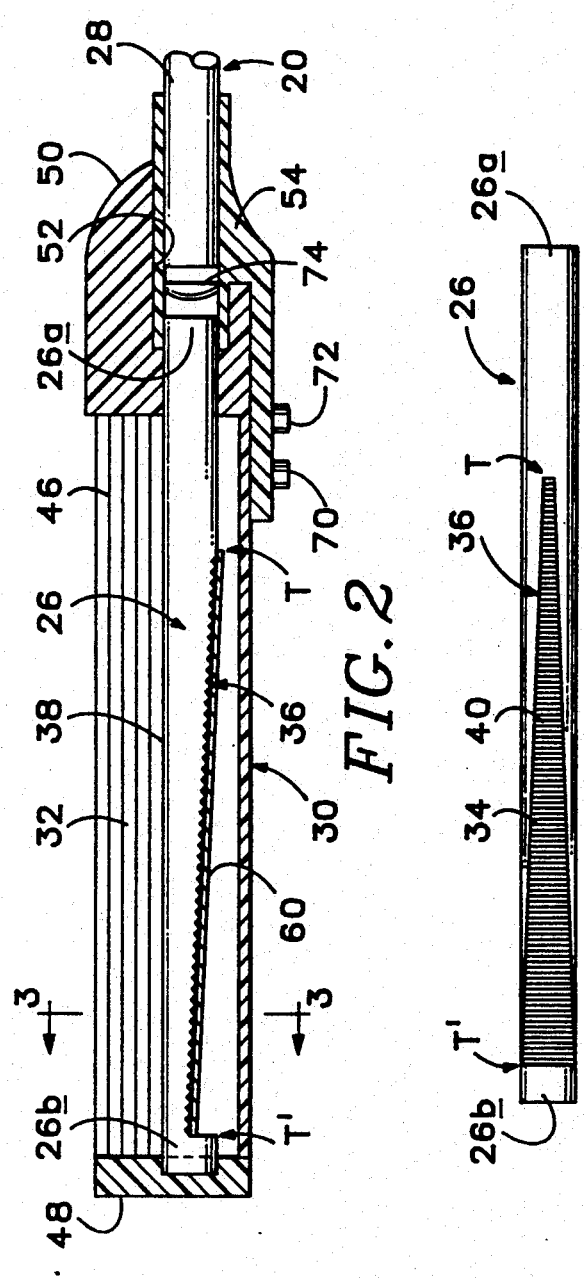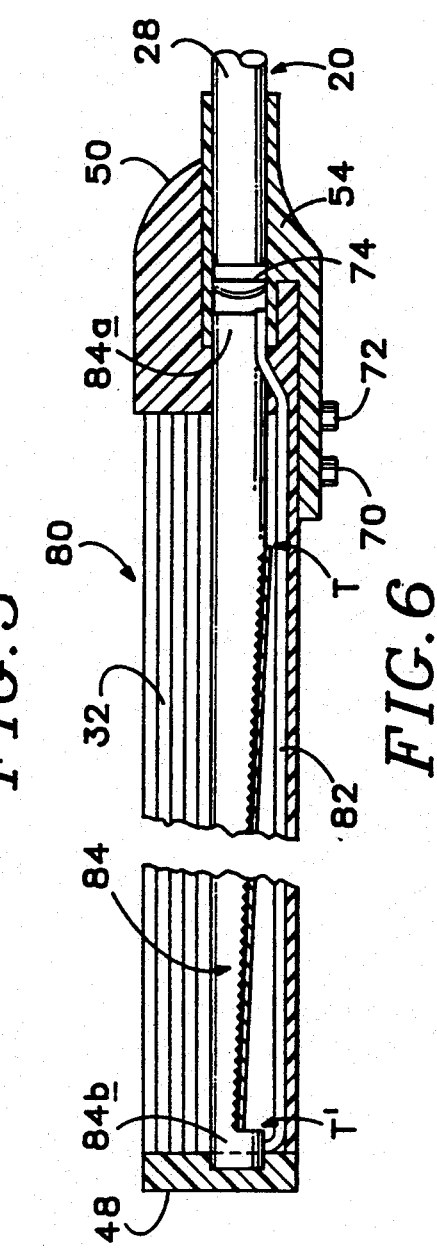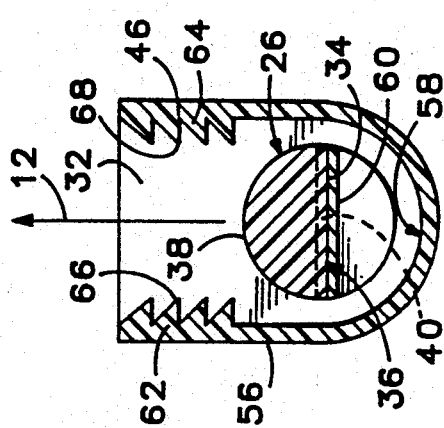

5,228,765

MOVABLE LIGHT PROJECTOR

BACKGROUND OF THE INVENTION

This invention relates to movable light projectors, and specifically to a light projector which may be used to achieve special lighting effects in a photographic studio.

It is sometimes desirable to create a "window" on a shiny object, by means of lighting, in order to achieve a special photograph effect. One technique for creating such a window is to use a conventional light source, such as a photo bulb, contained in a large reflector, wherein the reflector has neutral, or white, translucent material over the front thereof. Such a device is commonly referred to as a "soft box", and is used to create the desired window effect, which is a highlighted reflection of the light on the object being photographed. Soft boxes are generally quite large and are made of metal, fiberglass, nylon or other material. The light is directed at the object to be photographed, and positioned to achieve the desired effect. Light sources contained in soft boxes may be conventional photo bulbs, or the light source may be an electronic flash or even a fluorescent fixture. A soft box is intended to be used in a stationary position, and must be located out of the camera view.

In order to create the window highlight along the entire length of, for instance, an elongate object, an extremely large light must be used in order for the soft box to remain out of the photo, in order to transmit the desired amount of light to the subject. Generally, the soft box must be much larger than the object which it is being used to illuminate. It is therefore difficult, if not impracticable, to move the soft box, which results in a static, single position of the window effect on the subject. This frequently results in the presence of a dark area about the visual edge of the object. This dark area could be eliminated by shifting the position of the soft box during exposure of the film, however, the usual size of the soft box renders such movement during an exposure impracticable. Thus, it is not practical to attempt a wrap-around window effect with a soft box, wherein the window effect extends of more of the subject that it would with a static soft box.

Because the soft box is required to be fairly large, it directs a great deal of light into the object area of the photograph, and will generally provide sufficient light to illuminate the entire object area of the photograph. This limits the other lighting effects which the photographer is able to use.

An object of the instant invention is to provide a light projector which is movable, and which generates a narrow, elongate beam of light.

Another object of the invention is to provide a light projector which may be moved about in the photographic scene without being captured on film.

A further object of the invention is to provide a light projector which is connectable to a light source and an auxiliary shutter, and which will allow operation of the auxiliary shutter.

Yet another object of the invention is to provide a light projector which is interchangeable with other special effect lighting devices.

Another object of the invention is to provide a light projector which allows a wrap-around window effect on a subject.

Still another object of the invention is to provide a light projector which produces a relatively uniform light beam along its length, regardless of the length of the light projector.

SUMMARY OF THE INVENTION

The light projector of the invention includes a light source, which provides a light stream, and an elongate light wand, including an elongate transparent rod therein, for converting the light stream into an elongate light beam. An optical connector is provided for connecting the light wand to the light source.

These and other objects and advantages of the invention will become more fully apparent as the description which follows is read in conjunction with the drawings.

BRIEF DESCRIPTION OF THE DRAWINGS

FIG. 2 is a medial section of the light wand of the invention.

FIG. 3 is an enlarged cross section of the light wand, taken generally along line 3—3 of FIG. 2.

FIG. 4 is a greatly enlarged medial section of the light dispersing rod of the invention.

FIG. 5 is a bottom plan view of a light dispersing rod of the invention.

FIG. 6 is a medial section of a modified form of the light wand of the invention.

DETAILED DESCRIPTION OF THE PREFERRED EMBODIMENT

Figure 1:
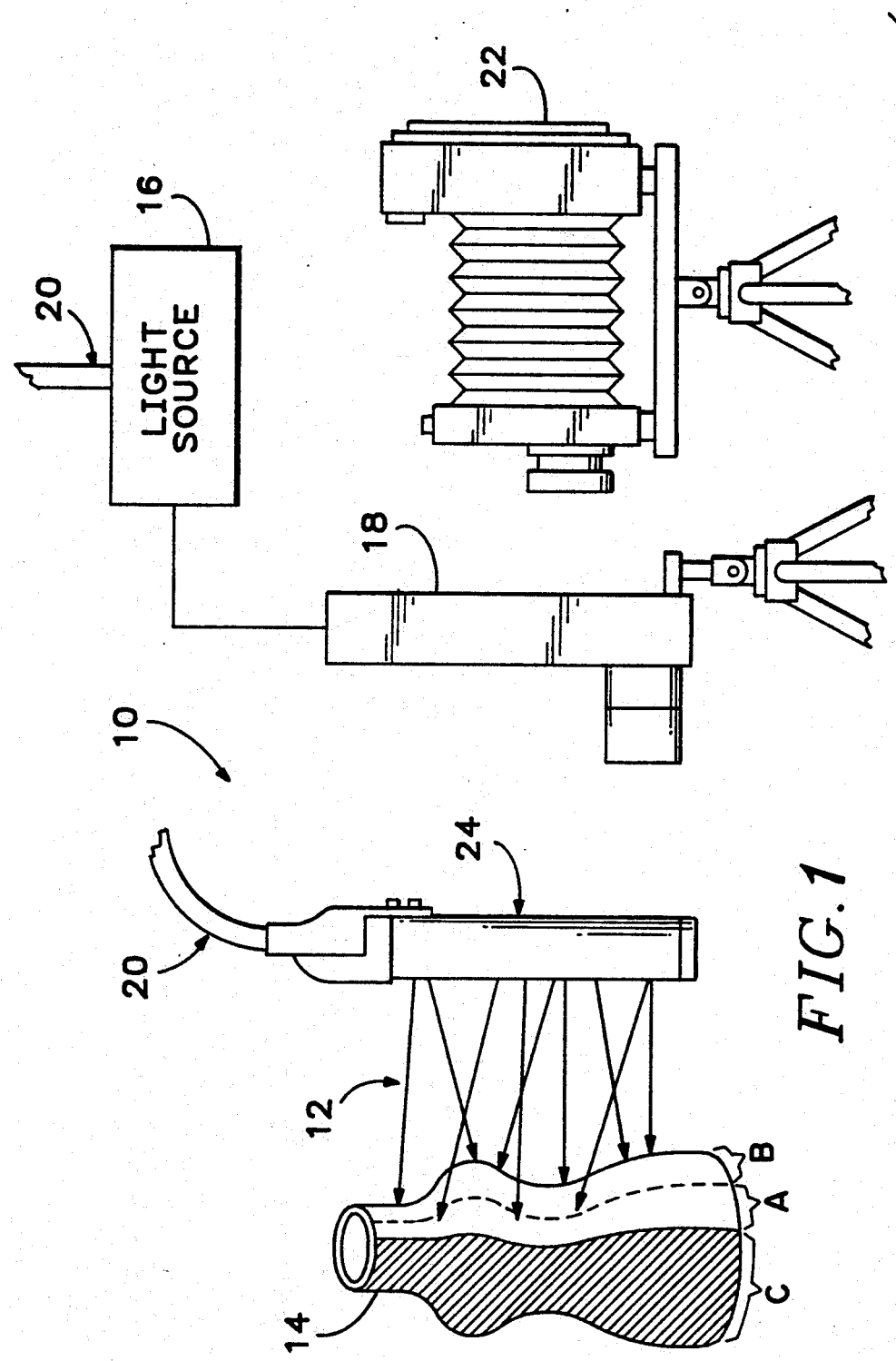
FIG. 1 depicts the movable light projector of the invention in an environmental setting.

Referring now to the drawings, and initially to FIG. 1, a movable light projector constructed according to the invention is depicted generally at 10. Projector 10 is shown projecting a light beam, depicted generally at 12, onto an irregularly shaped, reflective subject, or object, 14.

Projector 10 is, in the preferred embodiment, connected to a light source 16 and an auxiliary shutter 18. One form of light source and auxiliary shutter are described in my prior issued U.S. Pat. No. 5,029,309, granted Jul. 2, 1991 for PHOTOGRAPHIC EXPOSURE CONTROL APPARATUS AND METHOD. A modified form of that invention is taught in U.S. Pat. No. 5,034,761, granted Jul. 23, 1991 for PHOTOGRAPHIC EXPOSURE CONTROL APPARATUS HAVING REMOTE FILTER HOLDING MECHANISM.

Projector 10 is connected to light source 16 by means of an optical connector 20. As previously noted, the purpose of light projector 10 is to project an elongate light beam onto subject 14 so that a photograph of the subject may be taken with a camera 22. Movement of projector 10 during exposure of the film in camera 22 results in the formation of a window effect on object 14, which window effect may be made to cover as much or as little of object 14 as the photographer desires, through movement of the projector during exposure of the film.

Referring now to FIGS. 1-5, light projector 10 will be described in greater detail. Projector 10 includes an elongate light wand 24 which converts a light stream, generated by light source 16, into an elongate light beam 12. This conversion is accomplished by means of an elongate, light dispersing rod 26, which is optically connected to a fiber optic cable 28. Cable 28 is part of optical connector 20, which transmits the light stream from light source 16 to rod 26.

Rod 26 is carried in an opaque sheath 30, which surrounds rod 26 over a majority of its circumference or periphery, and which has an opening 32, extending along a side of the sheath and along most of the length of rod 26, allowing light beam 12 to escape from the interior of the sheath.

In the preferred embodiment, rod 26 is formed of five-eighths inch diameter clear acrylic, or other organic polymer material. Rod 26 has a circular cross section in the embodiment depicted herein, although the cross section may be square, rectangular, elliptical or any other desired shape. Rod 26 is milled to establish a flat surface 34, which forms a tapered portion 36, extending from adjacent one end 26a of the rod, which tapered portion begins at the point indicated by "T" and ends adjacent the other end 26b, as indicated at the point "T'". On the opposite side of the rod from tapered portion 36 is what is referred to herein as a smooth portion 38, from which light beam 12 is emitted.

Light beam 12 is emitted, in a relatively uniform intensity, from smooth portion 38 due to the presence of a light refracting surface formed on flat surface 34 of rod 26. In the preferred embodiment, the light refracting surface takes the form of serrations, or grooves, 40 which are formed in the milled flat surface 34 of tapered portion 36. Referring momentarily to FIG. 4, a greatly exaggerated segment of rod 26 is depicted. Grooves 40 typically have a center-line separation of 0.025 inches, as indicated at 42, have a depth of 0.01 inches, with forty grooves being formed per inch. The grooves are formed with a 90° angle, as indicated at 44. The spacing and angle of grooves 40 may be varied to produce light beams having different characteristics. Grooves 40 are provided to optimize the evenness of emitted light beam 12 along the length of rod 26. Other forms of light refracting surfaces may also be provided. Such surfaces may include a sand-blasted or stippled surface.

Sheath 30, in the preferred embodiment, includes an extruded portion 46, an end cap 48, and a hand piece 50, which includes a suitable mating connector 52 therein, for receiving a conformal mating connector 54, which may be provided with a bayonet mount, on the end of optical connector 20. In the preferred embodiment, extruded portion 46, end cap 48 and hand piece 50 are all formed of opaque material to prevent the extraneous dispersion of light from rod 26.

Extruded portion 36 includes a non-reflective outer portion 56, which may be formed by applying a matte finish to the extruded portion, or which may be integrally formed with the extruded portion during manufacture. Extruded portion 46 further includes a curved inner surface 58 which is located about the periphery of rod 26.

Portion 46 also includes sides 62, 64 which extend outwardly from curved surface 58, and include a non-reflective surface 66, 68, respectively, therealong. In the preferred embodiment, the non-reflective surface takes the form of a collection of serrations which are formed during the extruding process. A reflective cover 60 is provided along tapered portion 36 to enhance the intensity of beam 12. Cover 60 may take the form of a thin metallic or plastic mirror-like strip which is attached to rod 26. The tapper of the flat surface, bearing grooves 40, evenly disperses light along the length of rod 26. It should be noted that in the embodiment described herein, optical connector 20 includes a dispersing lens 74 at the end of fiber optic cable 28 in order to disperse light into the one end of rod 26.

The light stream is most intense near dispersing lens 74. The refractive grooves are narrowest, as they extend across the width of flat surface 34, adjacent lens 74, and refract less light through smooth portion 38, which acts as a light dispersing lens. As the distance from lens 74 increases, the grooves cover a wider portion of rod 26, refracting more light through smooth portion 38, which results the projection of in a relatively uniform intensity light beam 12 along the length of the rod. As previously noted, beam 12 has a relatively uniform intensity along the length of rod 26. In photographic terms, the light emitted from rod 12 at T' is approximately $\frac{3}{4}$ of an f stop less than the intensity of the light emitted from rod 26 at T. If the rod is used without the provision of the refractive surface, the intensity drops off by approximately 4 f stops. Inner surface 58 may also be formed with a reflective coating to further enhance the light emitting properties of the wand.

As previously noted, projector 10 may be used with a light source and auxiliary shutter, as described in the aforementioned U.S. Patents. One of the features of the auxiliary shutter described in the later issued patent is that a filter may be activated by means of controls at the end of the fiber optic cable. In the embodiment described herein, such controls are located on mating connector 54, and take the form of switches, or push buttons, 70, 72, which may be used to activate an auxiliary shutter and filter, respectively. The switches are incorporated into the end of optical connector 20 so that they may be used with a variety of optical devices which are coupleable to optical connector 20.

As the light stream, represented by arrows 76, travels along rod 26, portions of the light stream strike the flat surfaces of grooves 40, and are reflected outwardly through smooth portion 39 of rod 26, wherein they become a part of elongate light beam 12. This conversion of light stream 76 into light beam 12 is quite literally performed by mirrors. Reflective coating 60 further enhances the intensity of light beam 12.

Referring now to FIG. 6, a modified form of the elongate light wand is depicted generally at 80. Where appropriate, like reference numbers have been used to refer to like pieces of the invention. The primary modification to wand 80 is the provision of a length of fiber optic cable 82 which extends from adjacent dispersing lens 74 to the other end 84b of a light dispersing rod 84. Cable 82 may be secured in a portion of rod 84 to gather light from lens 74 and transmit the light to the other end 84b of the rod. The rod may be formed with a double taper, i.e. a medial section that would have the characteristic of T-T-'-T, if desired to enhance its light dispersing characteristic. This modification is provided for longer, i.e., greater than twenty-four inches, rods in order to provide even illumination of the rod along its length. Another alternative embodiment is the provision of a second optical connector between the light source and the distal end of the rod, which is effectively two rods, joined other end to other end, to form a substantially longer wand. It must be remembered that the light intensity still diminishes as it extends further from its source, even though it is being guided by fiber optics and an acrylic rod.

OPERATION

In order to use light projector 10, and now referring to FIG. 1, the photographer arranges the camera, subject and, if used, auxiliary shutter 18. Light source 16 is activated, thereby producing light stream 76 and light beam 12, which emanates from wand 24. The photographer may first experiment with the positioning of light beam 12 in order to achieve the desired effect. The studio is darkened and wand 24 maneuvered in order to play light beam 12 over the parts of subject 14 which are desired to be highlighted.

Once the photographer is satisfied that a proper window effect will be created, the lens on camera 22 is opened, and light beam 12 is projected onto subject 14. If auxiliary shutter 18 is in use, switch 70 may be depressed to open the shutter, thereby exposing the film in camera 22. Once the desired exposure is made with light beam 12, switch 70 is released, and auxiliary shutter 18 closes, stopping the exposure of the film in camera 22. Additionally, other exposures may be made with light from wand 24. Other special effect devices may be added to optical connector 20 in order to achieve the desired lighting effects of the photograph.

In the event that an auxiliary shutter is not being used, the normal lens on camera 22 must be used to make the exposure, or, some other means must be provided to allow light reflected from subject 14 selectively to reach the film in camera 22.

The light wand of the invention may be used within the picture area, so long as the shield is faced towards the camera, and may be moved to within a few inches of a particular object, lighting only the object. This allows other objects in the photo to be independently illuminated, possibly with other special effect lighting. The light wand may be used to create a wrap-around window effect, because the wand may be moved to illuminate around the visible edges of an object by moving the wand with the camera shutter open. The highlighted window effect area may easily be extended around the visible edge of the object. Additionally, the width of the highlighted window may be precisely controlled by the movement of the wand.

A wand having a length of 20 inches may be played over a surface which, for instance, is 20 inches by 40 inches, with the resulting illumination being equal to that provided by a 20×40 in light box used as a soft box. The 20×40 inch soft box will likely be illuminated by a photo bulb of several thousand watts, which would generate a great deal of heat. The resulting photo will generally have a dark area adjacent the visible edge of the illuminated object because it is impracticable to move the soft box. In some instances, the dark area may be desireable, however, the photo may have a more dramatic effect if the dark area adjacent the visible edge of the object is eliminated.

Subject 14 has areas A, B and C depicted thereon. In the case where a conventional soft box is used, only area A may be illuminated, or windowed, leaving areas B and C in shadow. As it is unlikely that the soft box will be moved during an exposure, only a limited area of the subject will be illuminated to create the window effect. The size of the illuminated area will depend on the shape of the subject, the size of the soft box, and the distance between the soft box and the subject.

Using the projector of the invention, the wand thereof may be moved, thereby projecting light over any amount of the subject, such as is depicted in FIG. 1, where areas A and B are illuminated, in what is referred to herein as a wrap-around effect, leaving only area C in shadow. Wand 24 may be maneuvered in order to illuminate as much or as little of the subject as desired, regardless of the size or shape of the subject.

The light source for a 20 inch wand will generally contain a photo bulb of several hundred watts, which will produce much less heat, and will, therefore, be much more energy efficient.

An important feature of wand 24 is the provision of the non-reflective sheath which surrounds rod 26. Given that the light projector of the invention is generally used in a darkened studio, the wand may be moved within an inch or two of the subject in order to direct light on the subject. Since the only light in the studio emanates from rod 26 in wand 24, and since the outer surface and part of the inner surface of the sheath is non-reflective, it will not reflect any light to the film in camera 22, and will, therefore, not appear in the photograph, even though it is in the field of view of the camera. The projector of the invention, therefore, requires substantially less light intensity than the prior art soft box, and allows the photographer much more control over the light which impinges on the subject being photographed.

Although a preferred embodiment of the invention, and a modified form thereof have been disclosed herein, it should be appreciated that variations and modifications may be made thereto within the scope of the invention as defined in the appended claims.

What I claim is:

1. A movable light projector comprising:
   a light source for providing a light stream;
   an elongate light wand for converting said light stream into an elongate light beam, said wand including an elongate rod having a light refractive surface thereon, is formed of transparent material, has grooves formed on one side thereof, and wherein said light beam is emitted along a smooth side of said rod; and
   an optical connector for connecting said light wand to said light source.

2. The light projector of claim 1 wherein said rod has a round cross section.

3. The light projector of claim 1 wherein said grooves are formed on a flat surface, and wherein said flat surface forms a tapered portion of said rod, said tapered portion beginning adjacent one end of said rod and extending towards said other end of said rod.

4. The light projector of claim 3 which further includes a reflective surface fixed along said tapered portion to reflect said light stream through said smooth side.

5. The light projector of claim 1 wherein said wand includes a fiber optic cable extending between one end of said rod and the other end thereof for transmitting a portion of said light stream to said other end of said rod.

6. The light projector of claim 1 wherein said wand includes an opaque sheath surrounding said rod over a majority of said rod's periphery, said sheath having an opening along a side thereof extending along the length of said rod.

7. The light projector of claim 6 wherein said sheath has a non-reflective outer surface, a curved surface located about the periphery of said rod, and sides which extend from said curved surface to said opening.

8. The light projector of claim 7 wherein the interior surfaces of said sides of said sheath include a non-reflective surface.

9. The light projector of claim 6 wherein said sheath includes a mating connector for attachment to said optical connection at one end thereof and an opaque end cap at the other end thereof.

10. The light projector of claim 1 wherein said optical connector includes a fiber optic cable having mating connectors on each end thereof for attachment to mating connectors on said light source and on said wand.

11. The light projector of claim 1 wherein said elongate beam is relatively narrow compared to its length.

12. A movable light projector in combination with a light-tight enclosure having a light source, for providing a light stream, therein, an elongate, light transmitting cable extending from the light source and terminating in a connector, and an auxiliary shutter, the movable light projector comprising:

an elongate light wand for converting the light stream into an elongate light beam, said wand including a mating connector for attaching said wand to said connector on the light transmitting cable.

13. The combination of claim 12 wherein said wand includes an elongate rod, having a round cross-section, formed of transparent material, wherein said light beam is emitted along the side of said rod.

14. The combination of claim 13 wherein said rod includes a light refracting surface thereon.

15. The light projector of claim 13 wherein said rod has a flat surface formed thereon, wherein grooves are formed on said flat surface, and wherein said flat surface forms a tapered portion of said rod, said tapered portion beginning adjacent one end of said rod and extending towards said other end of said rod, said grooves extending normal to the major axis of said rod, which includes a refractive surface fixed along said tapered portion, wherein the light stream is refracted by said grooves in the interior of said rod and is emitted as a light beam from a smooth side of said rod, which is located opposite said flat surface.

16. The combination of claim 13 wherein said wand includes a fiber optic cable extending between one end of said rod and the other end thereof for transmitting a portion of said light stream to said other end of said rod.

17. The combination of claim 13 wherein said wand includes an opaque sheath surrounding said rod over a majority of said rod's circumference, said sheath having an opening along a side thereof extending along the length of said rod, wherein said sheath has a non-reflective outer surface, a curved surface located about the periphery of said rod, and sides which extend from said curved surface to said opening, including a non-reflective surface on the interior thereof.

18. The combination of claim 12 which further includes controls for the auxiliary shutter on the connector.

19. A light projector for emitting a light beam wherein the emitted light beam has substantially even intensity of light along the length of the projector, wherein a light source coupled to the projector provides a light stream thereto, comprising:

an elongate rod, formed of transparent material, for transmitting a light beam along one, smooth surfaced side thereof, and including a light refractive, grooved, flat surface located thereon, wherein said flat surface forms a tapered portion of said rod, said tapered portion beginning adjacent one end of said rod and extending towards another end of said rod.

20. The light projector of claim 19 which further includes a reflective surface fixed along said tapered portion to direct the light stream through said smooth side.

21. The light projector of claim 19 wherein said rod has a round cross section.

22. The light projector of claim 19 which includes a connector and wherein the light source is coupled to said rod through said connector at said one end of said rod.

23. The light projector of claim 22 which includes a fiber optic cable extending between one end of said rod and said other end thereof for transmitting a portion of the light stream to said other end of said rod.

* * * * *